United States Patent
Xue et al.

(10) Patent No.: US 6,711,181 B1
(45) Date of Patent: Mar. 23, 2004

(54) SYSTEM AND METHOD FOR PACKET PARSING AND DATA RECONSTRUCTION IN AN IEEE 1394-1995 SERIAL BUS NETWORK

(75) Inventors: Xin Xue, San Jose, CA (US); Kevin Lym, Alameda, CA (US); Hisato Shima, Mountain View, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 09/441,114

(22) Filed: Nov. 17, 1999

(51) Int. Cl.$^7$ ................................................. H04J 3/06
(52) U.S. Cl. .................. 370/504; 370/389; 370/394; 370/474; 370/476; 370/509; 709/232; 709/250; 710/30; 710/52; 710/305; 711/171; 711/172; 711/173; 725/134; 725/142
(58) Field of Search ................................. 370/386, 389, 370/474, 476, 503, 504, 506, 509, 394; 709/232, 250, 328; 710/100, 305, 306, 307, 52, 19, 30; 711/170, 171, 172, 173; 725/134, 142, 100, 89; 375/240.27, 240.25

(56) References Cited

U.S. PATENT DOCUMENTS

| | | | |
|---|---|---|---|
| 5,400,340 A | 3/1995 | Hillman et al. | 370/105.3 |
| 5,412,698 A | 5/1995 | Van Brunt et al. | 375/373 |
| 5,444,709 A | 8/1995 | Riddle | 370/94.1 |
| 5,493,570 A | 2/1996 | Hillman et al. | 370/105.3 |
| 5,646,941 A * | 7/1997 | Nishimura et al. | 370/389 |
| 5,710,773 A | 1/1998 | Shiga | 370/512 |
| 5,758,075 A | 5/1998 | Graziano et al. | 395/200.8 |
| 5,781,599 A | 7/1998 | Shiga | 375/376 |
| 5,835,793 A | 11/1998 | Li et al. | 395/898 |
| ,003,795 A1 * | 1/2002 | Oskouy et al. | 370/389 |
| 6,363,428 B1 * | 3/2002 | Chou et al. | 709/232 |
| 6,483,951 B1 * | 11/2002 | Mendenhall et al. | 382/300 |
| 6,499,079 B1 * | 12/2002 | Gulick | 710/305 |

FOREIGN PATENT DOCUMENTS

| | | | |
|---|---|---|---|
| EP | 0 804 008 A | 10/1997 | H04L/29/06 |
| EP | 0 874 503 A | 10/1998 | H04L/29/06 |
| EP | 0 942 569 A | 9/1999 | H04L/29/06 |
| EP | 0 952 526 A | 10/1999 | G06F/13/10 |

OTHER PUBLICATIONS

Michael Teener et al., "A Bus on a Diet—The Serial Bus Alternative, An Introduction to the P1394 High performance Serial Bus" Apple Computer, Inc. Santa Clara, CA, Pub. Date.: Feb. 24, 1992, pp. 316–321.

P1394 Standard For A High Performance Serial Bus, IEEE, 1995.

"The IEEE–1394 High Speed Serial Bus," R.H.J. Bloks, Philips Journal Of Research, vol. 50, No. 1/2, pp. 209–216, 1996.

* cited by examiner

*Primary Examiner*—Dang Ton
*Assistant Examiner*—Shick Hom
(74) *Attorney, Agent, or Firm*—Haverstock & Owens LLP (57) ABSTRACT

A system for packet parsing and data reconstruction in an IEEE 1394-1995 serial bus network includes a network interface unit, a processing unit, and a memory wherein an operating system resides. The operating system includes a streaming services module and a multimedia Application Program Interface (API) module. The network interface unit receives a stream of packets from a transmission device. Each packet includes a header portion, and may also include a data portion. The data portion, if present, stores data content generated from source data organized in accordance with a predetermined format. The streaming services module stores and then parses the received packets. A method for packet parsing and data reconstruction includes the steps of receiving a packet stream; storing a first and a second packet; locating a header portion within the first packet; and determining whether a header portion within the second packet immediately follows the header portion within the first packet. The method may also include the steps of determining whether the first packet corresponds to a particular boundary within the source data, such as the beginning of a digital video (DV) frame; and transferring data content within the first packet to a buffer.

17 Claims, 8 Drawing Sheets

|  | Block ID Byte 0 | Block ID Byte 1 | Block ID Byte 2 |
|---|---|---|---|
| (msb) | SCT 2 | D Seq 3 | DBN7 |
|  | SCT 1 | D Seq 2 | DBN6 |
|  | SCT 0 | D Seq 1 | DBN5 |
|  | RSV | D Seq 0 | DBN4 |
|  | Seq 3 | 0 | DBN3 |
|  | Seq 2 | RSV | DBN2 |
|  | Seq 1 | RSV | DBN1 |
| (lsb) | Seq 0 | RSV | DBN0 |

SYSTEM AND METHOD FOR PACKET PARSING AND DATA RECONSTRUCTION IN AN IEEE 1394-1995 SERIAL BUS NETWORK

FIELD OF THE INVENTION

The present invention relates to the field of communicating packetized data between network node devices. More particularly, the present invention relates to the field of processing packetized data by parsing isochronously received data packets to facilitate data reconstruction operations.

BACKGROUND OF THE INVENTION

International standard IEEE 1394-1995, "IEEE 1394-1995 Standard For A High Performance Serial Bus," defines an economical, scalable, high-speed serial bus architecture. This standard provides a universal input/output connection for interconnecting digital devices including, for example, audio-visual equipment and personal computers.

The IEEE 1394-1995 standard defines a peer-to-peer network architecture characterized by point-to-point signaling. A network implemented in accordance with the IEEE 139-1995 standard comprises a plurality of nodes, where each node includes one or more ports. Ports may be linked together via standardized cabling, subject to a restriction that disallows closed loops. In terms of physical topology, the IEEE 1394-1995 standard provides for a non-cyclic network having multiple ports and finite branches.

The IEEE 1394-1995 standard supports both asynchronous and isochronous information transfers. Asynchronous transfers are operations that communicate data from a source node to a destination node and take place as soon as permitted after initiation. Asynchronous transfer operations do not provide a mechanism for maintaining temporal relationships within an information stream between successive data transfers. An example of an application appropriate for asynchronous data transfer is communication of a still image or text document. Control commands can also be sent asynchronously.

Isochronous transfers provide information delivery characterized by predictable, bounded latency; guaranteed bandwidth; and on-time data reception. Time intervals between particular events have essentially the same duration at both the transmitting and receiving applications. Isochronous transfer is particularly advantageous in real-time multimedia applications, such as the real-time transfer of digital audio and video data between a digital video camera and a digital television.

Figure 1:
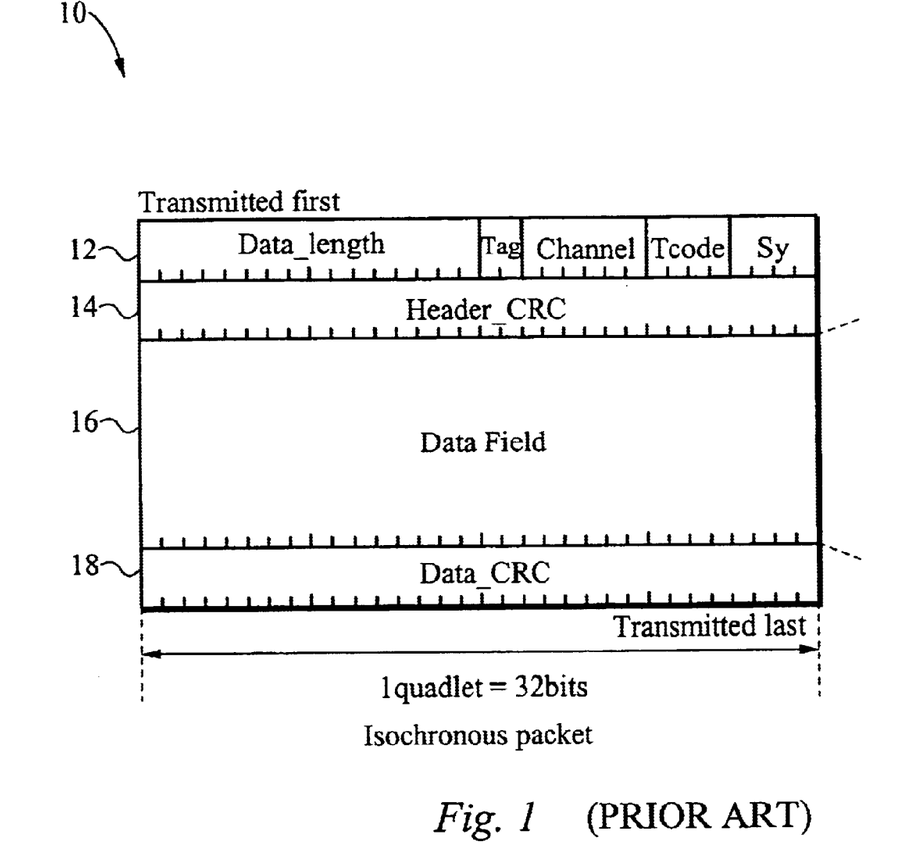
FIG. 1 is a block diagram of an IEEE 1394-1995 isochronous packet.

The IEEE 1394-1995 standard defines a structured packet into which information is encapsulated for isochronous transfer upon the bus. FIG. 1 is a block diagram showing an IEEE 1394-1995 isochronous packet 10. The IEEE 1394-1995 isochronous packet 10 includes a header field 12; a header cyclic redundancy check (CRC) field 14; a payload data field 16; and a payload data CRC field 18.

The IEEE 1394-1995 standard does not specify particular formats for the contents of the payload data field 16. Rather, the organization of payload data in accordance with a particular format and the interpretation of payload data field contents are functions of the transmitting and receiving applications, respectively. In order to facilitate interoperability between a wide range of digital devices, payload data fields 16 should encapsulate data in accordance with a standardized format. One such format that has gained wide acceptance is the Common Isochronous Protocol (CIP).

Figure 2:
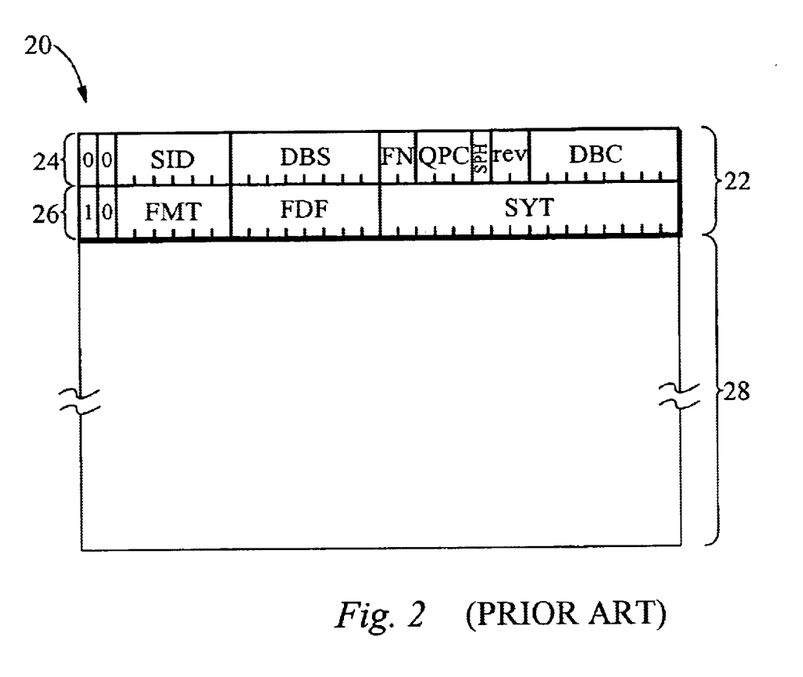
FIG. 2 is a block diagram of a Common Isochronous Protocol packet.

FIG. 2 is a block diagram showing a CIP packet 20. The CIP packet 20 includes a CIP header field 22 and a CIP data field 28. The CIP header field 22 spans a first and a second CIP header quadlet 24, 26 (i.e., 8 bytes total), while the CIP data field 28 spans 480 bytes. The CIP header field 22 stores source node identification and timing information, plus parameters that define manners in which the information contained in the CIP data field 28 may be interpreted.

A device that receives a stream of IEEE 1394-1995 isochronous packets 10 typically stores the contents of each such packet's payload data field 16 in a receive buffer. Thus, when payload data fields 16 contain CIP packets 20, a first receive buffer contains a sequence of CIP packets 20. Once the first receive buffer is full, the receiving device stores subsequent CIP packets 20 in a second receive buffer. Hardware and/or software concurrently processes the CIP packet sequence in the first receive buffer to reconstruct data contained therein in accordance with a format expected by an application program. For example, software may process CIP packet sequences by extracting video data and generating a complete video frame in accordance with a standard format such as Digital Video (DV). A DV frame comprises 120 kilobytes of compressed digital audio and video data, organized as a set of Data in Frame (DIF) sequences. Once constructed, the DV frame may be delivered to an application program for decompression and playback.

Due to timing and data availability considerations, the CIP data field 28 within a particular CIP packet 20 may not contain any information. That is, some CIP packets 20 may contain CIP header information only, being empty in terms of data content. Processing sequential CIP packets 20 under the assumption that data immediately follows CIP header information may therefore produce data reconstruction errors.

The generation of a complete DV frame occasionally requires data from more than one receive buffer. Moreover, the first receive buffer occasionally contains data forming an incomplete DV frame, followed by some or all data necessary to generate a first complete DV frame. Some application programs are incapable of accepting an incomplete DV frame. Hence, processing CIP packets 20 under the assumption that 1) a full DV frame can be generated using a single receive buffer; or 2) a first received CIP packet 20 may be used to begin constructing a first complete DV frame may also produce data reconstruction errors.

SUMMARY OF THE INVENTION

The present invention comprises a system and method for parsing the content of packets received from a source node within a networked node environment. The networked node environment preferably comprises an IEEE 1394-1995 serial bus network that includes the source node and at least one destination node. The source node serves as a data transmission unit that transfers a stream of IEEE 1394-1995 isochronous packets 10 to the data reception unit. Each IEEE 1394-1995 packet 10 contains a CIP packet 20. The data reception unit parses the CIP packets 20, and reconstructs data obtained therefrom in accordance with a predetermined format. The source node serves may be, for example, a digital camcorder, a digital videocassette recorder, or a computer system. The destination node is preferably a computer system. The destination node could be essentially any device or system capable of processing a received information stream in accordance with the present invention.

Within the computer system, an IEEE 1394-1995 interface unit receives the stream of IEEE 1394-1995 packets 10, and transfers the CIP packets 20 contained therein to a first isochronous receive buffer. Upon filling the first isochronous receive buffer, the interface unit begins filling a second isochronous receive buffer, and so on. After the first isochronous receive buffer is full, a parsing state machine locates a CIP header field 22 within a first CIP packet 20 in the first isochronous receive buffer. The parsing state machine determines whether the first CIP header field 22 is immediately followed by a CIP header field 22 within a second CIP packet 20. If so, the first CIP packet 20 is empty. The parsing state machine then determines whether the second CIP packet 20 is empty, and so on.

Upon finding a CIP header field 22 that is immediately followed by a CIP data field 28, the parsing state machine transfers DV data within the CIP data field 28 to a user buffer. The parsing state machine transfers CIP data field contents to the user buffer only after finding a non-empty CIP packet 20 that corresponds to the beginning of a DV frame. After transferring DV data to the user buffer, the parsing state machine considers subsequent CIP packets 20 within the first isochronous buffer. After considering each packet within the first isochronous buffer, the parsing state machine considers CIP packets 20 within the second isochronous buffer, and so on. In the event that the interface unit has stored a given non-empty CIP packet 20 as a first partial CIP packet and a second partial CIP packet across two successive isochronous receive buffers, the parsing state machine transfers DV data from within each partial CIP packet to the user buffer.

Once a user buffer is full, it preferably contains an entire DV frame. The parsing state machine returns the filled user buffer to the stream class driver. The stream class driver delivers complete DV frames to a multimedia Application Program Interface (API) module, which may then perform operations such as frame decompression and rendering.

One aspect of the present invention is a method for parsing a stream of packets received from a transmission device, where a subset of packets within the stream include data content. The data content is generated from, or forms a portion of, source data that is organized in accordance with a predetermined format. The predetermined format may be, for example, a standard DV frame format. The method includes the step of receiving a stream of packets, where such packets preferably comprise IEEE 1394-1995 isochronous packets, each of which includes a CIP packet 20. Each CIP packet 20 includes a header field 22, and may include a data field 24. The method further includes the steps of storing a first and a second received packet, and locating a header portion within the first packet. In the preferred embodiment, the header portion may be located by successively comparing stored quadlets with the expected format of CIP header information. The method additionally includes the step of determining whether a header portion within a second stored packet immediately follows the header portion within the first stored packet. If so, the first stored packet is empty in terms of data content, in which case the data content of the second stored packet can be considered.

The method may also include the step of determining whether the first packet corresponds to a particular boundary within the source data, such as the beginning of a DV frame. Additionally, the method may include the step of transferring data content from the first packet to a destination buffer. The packet stream is preferably received isochronously, in accordance with the IEEE 1394-1995 standard.

The method may further include the steps of storing a first portion of the second packet in a first receive buffer, and a second portion of the second packet in a second receive buffer. If the second packet includes data content, the method may include the steps of transferring data content associated with the second packet from the first receive buffer to a destination buffer, and transferring data content associated with the second packet from the second receive buffer to the destination buffer. The method may additionally include the step of advancing to a location within the second receive buffer that is beyond the portion of the second packet stored therein.

Another aspect of the invention is a system for parsing a stream of packets received from a transmission device, where a subset of packets within the stream include data content. The system includes a stream reception unit coupled to receive the stream of packets; a processing unit; and a memory wherein a first buffer, a second buffer, a stream storage module, and a parsing module reside. The stream storage module receives a stream of packets from the stream reception unit, and stores a packet sequence in a receive buffer. The parsing module determines whether successive packets residing in the receive buffer include data content, and, if so, stores such data content in a destination buffer. Preferably, the stream of packets is communicated isochronously, in accordance with the IEEE 1394-1995 standard. In such a case, the stream reception unit includes circuitry for interfacing to an IEEE 1394-1995 serial bus.

The system may further include an API module within the memory that is responsive to a signal generated by the parsing module. This signal indicates that the API module may begin processing the contents of the destination buffer, for example, by performing DV frame decompression and rendering operations.

Still another aspect of the invention is a data communication network in which a sending node configured to transmit data packets is coupled via a network segment to a receiving node configured to receive and parse such packets. Each transmitted packet includes header information, while a subset of transmitted packets also include data content. The receiving node includes a network interface unit coupled to receive a stream of packets; a processing unit; and a memory in which a receive buffer, a destination buffer, a packet storage module, and a parsing module reside. The packet storage module stores a sequence of received packets in the receive buffer. The parsing module determines whether packets within the receive buffer include data content, and, if so, stores such data content in the destination buffer. In the preferred embodiment, the data packets are communicated isochronously from the sending node to the receiving node, and the network segment is an IEEE 1394-1995 serial bus.

The memory may further include an API module that is responsive to a signal received from the parsing module. This signal indicates that the API module may initiate processing operations upon the contents of the destination buffer. Such operations may include, for instance, DV frame decompression and rendering operations.

According to yet another aspect of the present invention, an IEEE 1394 serial bus network includes an IEEE 1394 serial bus that couples a transmitting device and a receiving device. The transmitting device is configured to transmit a stream of packets upon the IEEE 1394 serial bus, where a subset of such packets include data content. The receiving device includes a stream reception unit coupled to receive the stream of packets; a processing unit; and a memory. The memory includes a receive buffer, a destination buffer, a stream storage module, and a parsing module. The stream storage module stores a sequence of packets received from the stream reception unit in the receive buffer. The parsing module determines whether successive packets residing within the receive buffer include data content, and, if so, stores such data content in the destination buffer.

According to another aspect of the present invention, a computer readable medium stores program instructions for directing a processing unit to parse a stream of packets. The packets are received from a transmission device, where a subset of such packets include data content generated from source data organized in accordance with a predetermined format. The program instructions may direct the processing unit to perform the steps of locating a header portion within a first packet; determining whether a header portion within a second packet immediately follows the header portion within the first packet; determining whether the first packet corresponds to a particular boundary within the source data, such as the beginning of a DV frame; and transferring data content within the first packet to a buffer.

DETAILED DESCRIPTION OF THE PREFERRED EMBODIMENT

Figure 3:
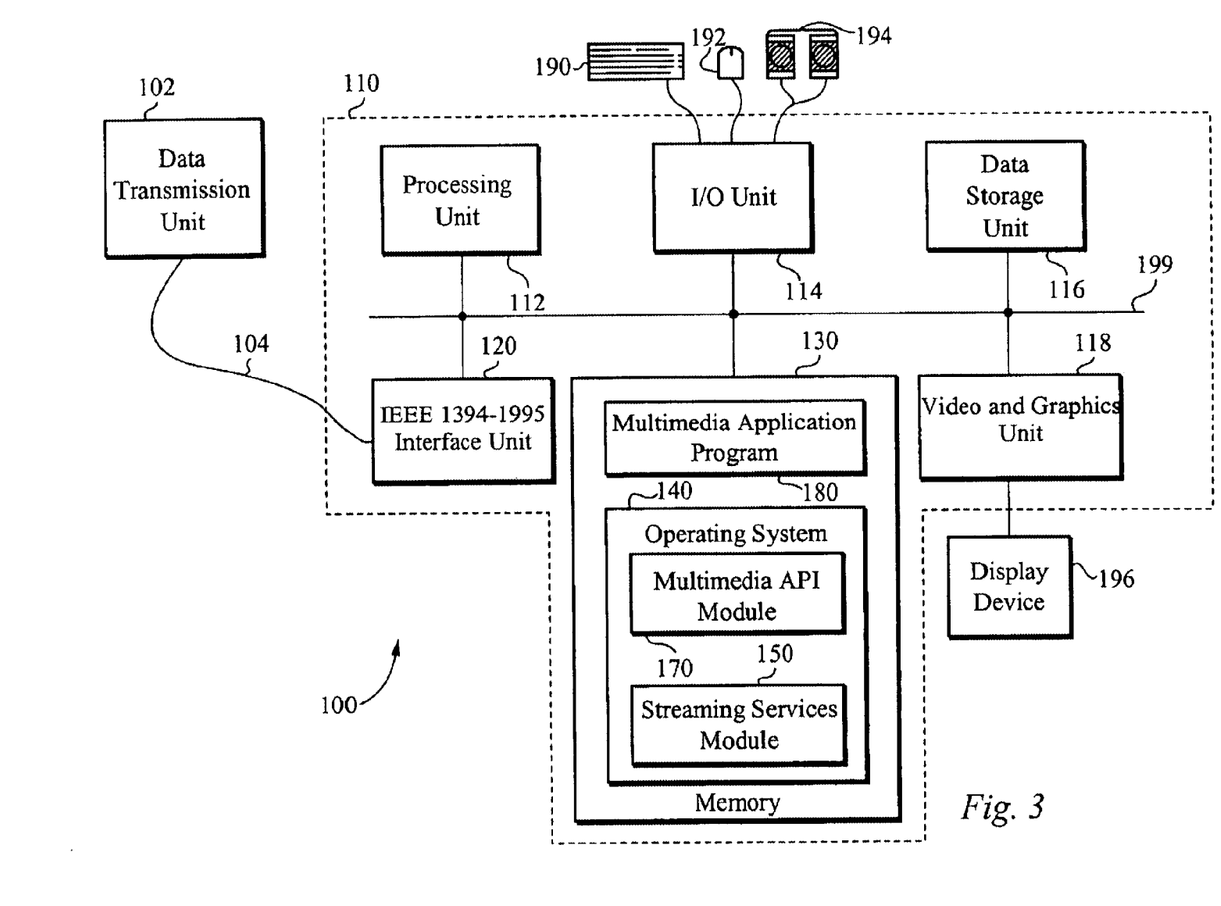
FIG. 3 illustrates an exemplary system organized in accordance with the present invention for packet parsing and data reconstruction.

FIG. 3 illustrates an exemplary system 100 organized in accordance with the present invention for packet parsing and data reconstruction in an IEEE 1394-1995 serial bus network. The system 100 comprises an IEEE 1394-1995 compliant data transmission unit 102 that is coupled via an IEEE 1394-1995 serial bus cable 104 to a data reception unit, which preferably comprises a computer system 110.

The serial bus cable 104 forms a segment of an IEEE 1394-1995 network that couples two nodes together, namely, the data transmission unit 102 and the computer system 110. Thus, the serial bus cable 104 provides a pathway for isochronous communication between the data transmission unit 102 and the computer system 110. Those skilled in the art will recognize that the system 100 could include data reception devices, data transmission/reception devices, and/or additional data transmission units 102 that are coupled to the computer system 110 via additional serial bus cables 104 in a conventional manner, depending upon the number of ports supported by the computer system 110. Similarly, the data transmission unit 102 could serve multiple computer systems 110 and/or other devices via additional serial bus cables 104. The system organization shown in FIG. 3 is considered herein for ease of understanding.

The data transmission unit 102 transmits source data to the computer system 110 in the form of an isochronous multimedia data stream. The data transmission unit 102 may be, for example, a digital video camera, such as a Sony DCR-TRV10 digital camcorder (Sony Corporation, Tokyo, Japan). Alternatively, the data transmission unit 102 could be a digital videocassette recorder (VCR), or even another computer system 110.

Figure 4A:
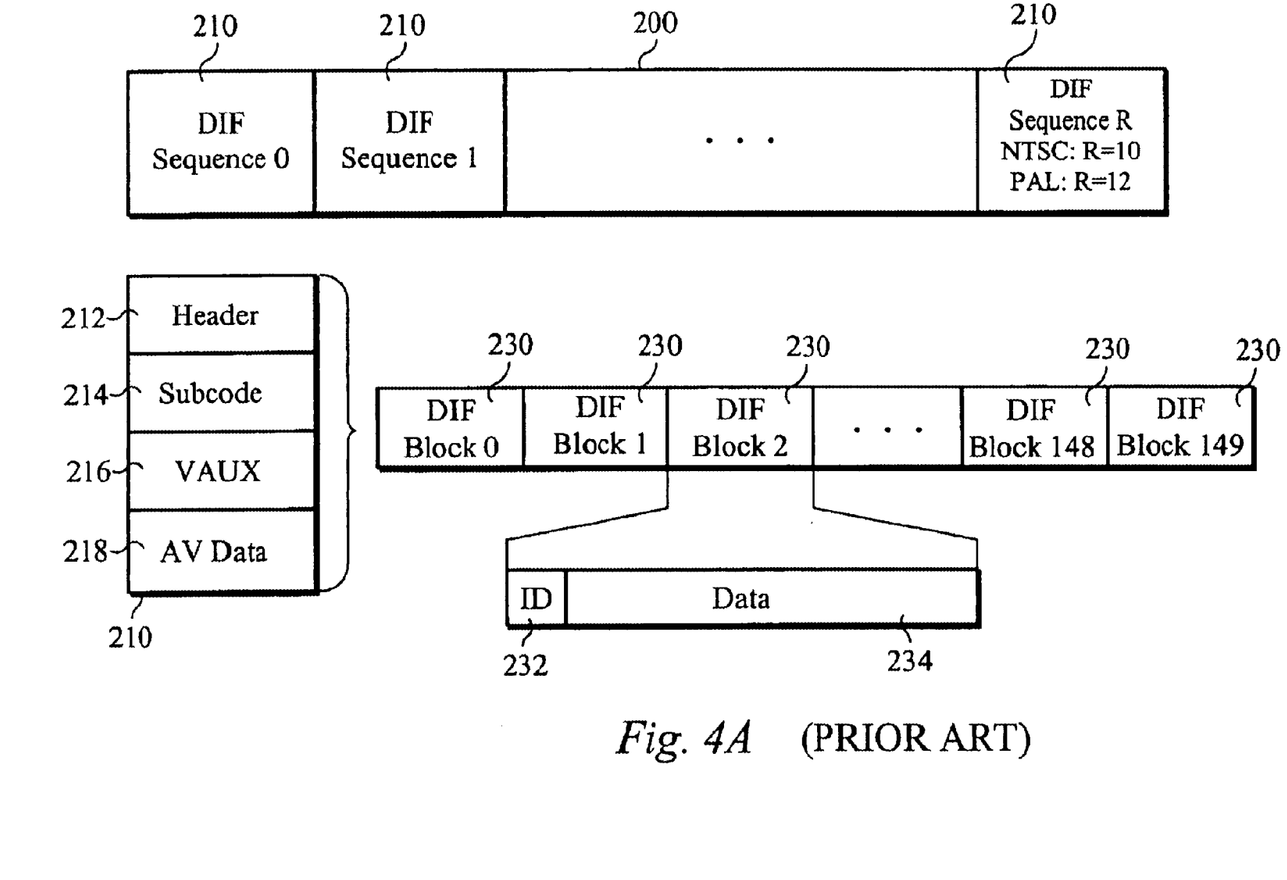
FIG. 4A is a block diagram of a standard DV frame.

Prior to transmission, the source data exists or is captured in accordance with a predetermined format. In the preferred embodiment, the source data comprises Digital Video (DV) data organized as a series of standard DV frames 200. Those skilled in the art will recognize that in an alternate embodiment, the source data could be organized in accordance with another format.

FIG. 4A is a block diagram defining a standard DV frame 200. The DV frame 200 spans 120 kilobytes, and comprises a set of DIF sequences 210. In environments supporting the National Television Standards Committee (NTSC) video format, the DV frame 200 includes 10 DIF sequences 210. In Phase Alternating Line (PAL) environments, the DV frame 200 includes 12 DIF sequences 210. Each DIF sequence 210 comprises a header section 212, a subcode section 214, a Video Auxiliary (VAUX) section 216, and an AV data section 218. Taken together, the aforementioned sections 212, 214, 216, 218 occupy 150 DIF blocks 230. Each DIF block 230 spans 80 bytes, and includes a 3 byte block identification (ID) field 232 followed by a 77 byte data field 234.

Figure 4B:
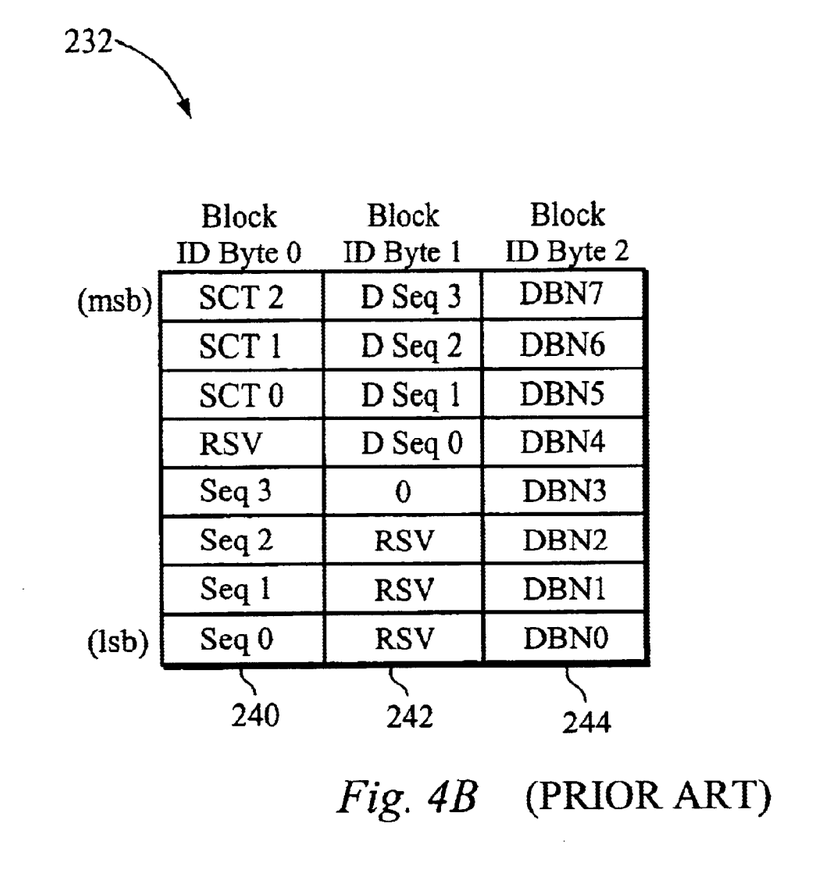
FIG. 4B is a table showing a standard byte content definition within a DIF block ID field.

FIG. 4B is a table showing a standard byte content definition within a block ID field 232. In least-significant to most-significant bit order, a first byte 240 includes 4 sequence bits (Seq 0 through 3), a reserved bit (RSV), and 3 section type bits (SCT 0, 1, and 2). A second byte 242 includes 3 reserved bits (RSV), a zero, and four DIF sequence bits (D Seq 0 through 3). Lastly, a third byte 244 includes 8 DIF block number bits (DBN 0 through 7). The beginning of a DV frame 200 corresponds to a) the first byte 240 having its section type bits equal to 0, and its reserved bit equal to 1; b) the second byte 242 having its DIF sequence bits equal to 0 and its reserved bits equal to 1; and c) the third byte 244 having its DIF block number bits equal to 0.

Hardware and/or software within the data transmission unit 102 converts the source data into the multimedia data stream. The multimedia data stream preferably comprises a sequence of IEEE 1394-1995 isochronous packets 10, each of which contains a CIP packet 20. Referring again to FIG. 2, each CIP packet 20 includes a CIP header field 22 and a CIP data field 28. In the preferred embodiment, the CIP data field 28 will usually include DV data. However, the CIP data field 28 will occasionally be empty as a result of timing and/or source data availability considerations.

Within the CIP header field 22, the first and second CIP header quadlets 24, 26 are subdivided in accordance with a predetermined format, in which an SID portion contains a source node ID that identifies the transmitting node. A DBS portion contains a value representing the size (in quadlets) of each data block within the CIP packet 20. In the context of the present invention, the data blocks present within a CIP packet 20 are preferably DIF blocks 230. An FN field contains a fraction number that indicates the number of data blocks into which the CIP packet 20 is divided. As the CIP data field 28 is defined to occupy 480 bytes, the CIP packet 20 can hold 6 DIF blocks 230. A QPC portion contains a value representing a number of dummy quadlets added to the CIP packet 20 to equalize the size of the divided data blocks. If the FN portion indicates that the source packet is undivided, then the QPC portion contains a zero value.

An SPH flag indicates whether the data within CIP packet 20 includes a source-supplied packet header, and is set to a logical one value when such a header is present. An rsv portion is reserved for future extension. A DBC portion contains a data block continuity counter that facilitates detection of data block loss. An FMT portion includes a format ID that specifies the packet's format type, and an FDF portion contains a format-dependent value. Finally, an SYT portion is used to synchronize the transmitting and receiving nodes. When transmitting isochronous data over an IEEE 1394-1995 serial bus network, the SYT portion includes a time stamp value. The receiving node can use this time stamp value to ensure that data is presented within appropriate temporal boundaries.

Referring again to FIG. 3, the computer system 110 comprises a processing unit 112; an input/output (I/O) unit 114; a data storage unit 116; a video and graphics unit 118; an IEEE 1394-1995 interface unit 120; and a memory 130 wherein an operating system 140 and a multimedia application program 180 reside. The operating system 140 includes a streaming services module 150 and a multimedia Application Program Interface (API) module 170. Each of the aforementioned computer system elements is coupled to a common bus 199.

The processing unit 112 comprises a microprocessor capable of executing stored program instructions. The I/O unit 114 comprises conventional circuitry for controlling I/O devices and performing particular signal conversions or other operations upon I/O data. The I/O unit 114 may include, for example, a keyboard controller, a serial port controller, and/or digital signal processing circuitry. In a preferred embodiment, the I/O unit 114 is coupled to a keyboard 190, a mouse 192, and a set of speakers 194. The I/O unit 114 may also be coupled to other devices, such as a microphone or a joystick.

The data storage unit 116 may include both fixed and removable media using any one or more of magnetic, optical, magneto-optical, or other available storage technology. The video and graphics unit 118 comprises conventional circuitry for operating upon and outputting data to be displayed, where such circuitry includes a graphics processor, a frame buffer, and display driving circuitry. The video and graphics unit 118 is coupled to a display device 196.

The IEEE 1394-1995 interface unit 120 is coupled to the serial bus cable 104, and comprises physical interface circuitry for sending and receiving communications in accordance with the IEEE 1394-1995 standard. The interface unit 120 receives a stream of IEEE 1394-1995 isochronous packets 10, and preferably removes or separates the header, header CRC, and data CRC information from the contents of each such packet's payload data field 16. The interface unit 120 subsequently communicates with operating system elements to facilitate CIP packet parsing and data reconstruction operations in accordance with the present invention, as described in detail below. In a preferred embodiment, the IEEE 1394-1995 interface unit 120 comprises a conventional plug-in interface card. Those skilled in the art will recognize that the IEEE 1394-1995 interface unit 120 could be implemented in other manners, such as via circuitry that is permanently resident upon a motherboard.

The memory 130 includes both Random Access Memory (RAM) and Read-Only Memory (ROM), and provides storage for program instructions and data. Within the memory 130, the operating system 140 comprises program instruction sequences that provide services for accessing, communicating with, and/or controlling computer system resources. The operating system 140 provides a software platform upon which application programs may execute, in a manner readily understood by those skilled in the art. As described in detail below, the streaming services module 150 comprises program instruction sequences that facilitate 1) CIP packet reception from the interface unit 120; 2) packet parsing and data reconstruction operations in accordance with the present invention; and 3) communication with the multimedia API module 170. The multimedia API module 170 comprises an application framework upon which the multimedia application program 180 is built, and which includes program instruction sequences that facilitate communication between the multimedia application program 180 and the streaming services module 150. The multimedia application program 180 comprises program instruction sequences that rely upon the multimedia API module 170 to initiate, manage, and/or control isochronous stream reception and the performance of multimedia operations. Such multimedia operations may include, for example, the decompression and display of Audio/Video (AV) data received from a digital camcorder.

In an exemplary embodiment, the computer system 110 is a personal computer having an Intel Pentium III microprocessor (Intel Corporation, Santa Clara, Calif.); 128 megabytes of RAM; a 20 gigabyte hard disk drive; a graphics accelerator card coupled to a 32 megabyte frame buffer; and an IEEE 1394-1995 interface card. The computer system 110 is coupled to a keyboard, a mouse, a high-resolution video display, and a set of speakers. Microsoft Windows98 TM (Microsoft Corporation, Redmond, Wash.) may serve as an exemplary operating system 130. The streaming services module 150 may be implemented via a set of software drivers, and the multimedia API module 170 may be implemented using the Microsoft DirectShow TM application framework.

The interface unit 120 serially receives an isochronous stream that comprises a sequence of IEEE 1394-1995 isochronous packets 10. Within any particular IEEE 1394-1995 isochronous packet 10, a CIP packet 20 that contains DV data comprises only a small portion of a DV frame 200. The multimedia API module 170, however, expects to receive significantly larger amounts of DV data at any given time. In the preferred embodiment, the multimedia API module 170 requires that DV data received from the streaming services module 150 comprise at least one DV frame 200.

When the multimedia API module 170 requires or expects DV data, it creates a plurality of user buffers, each of which is large enough to hold a DV frame 200. Each user buffer is preferably a conventional buffer that resides within the memory 130. Following their creation, the multimedia API module 170 passes the user buffers to the streaming services module 150, which acts as an intermediary between the multimedia API module 170 and the interface unit 120.

Figure 5:
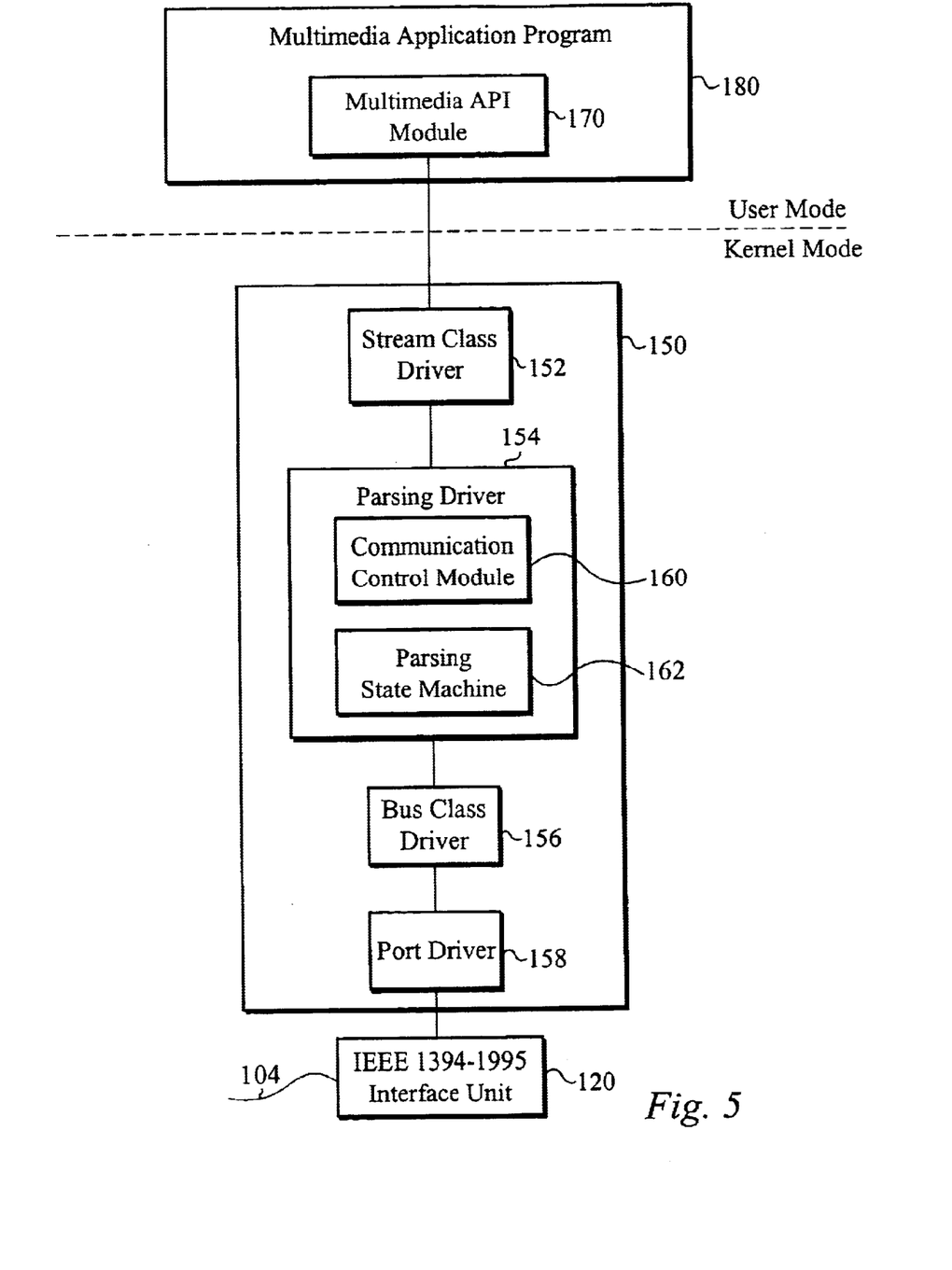
FIG. 5 is a block diagram of a preferred layered software architecture for a streaming services module of the present invention.

FIG. 5 is a block diagram showing a preferred layered software architecture for the streaming services module 150 relative to the multimedia application program 180, the multimedia API module 170, and the interface unit 120. The streaming services module 150 comprises a stream class driver 152; a parsing driver 154; a bus class driver 156; and a port driver 158. The stream class driver 152 serves as a data transport interface to the multimedia API module 170.

The stream class driver 152 manages 1) the generation of DV frames 200 from DV data received from the parsing driver 154; and 2) the transfer of user buffers containing DV frames 200 to the multimedia API module 170.

The parsing driver 154 initiates and performs CIP packet parsing and data reconstruction operations in accordance with the present invention. The parsing driver 154 preferably includes a communication control module 160 and a parsing state machine 162. The communication control module 160 comprises program instruction sequences that manage data communication with the stream class driver 152 and the bus class driver 156. The parsing state machine 162 parses CIP packets 20 in the manner described below with reference to FIG. 7. The bus class driver 156 provides the communication control module 160 with an interface to the IEEE 1394-1995 serial bus by communicating with the port driver 158. Finally, the port driver 158 communicates directly with the interface unit 120, and sequentially fills a set of isochronous receive buffers with CIP packets 20, as further described below.

Figure 6:
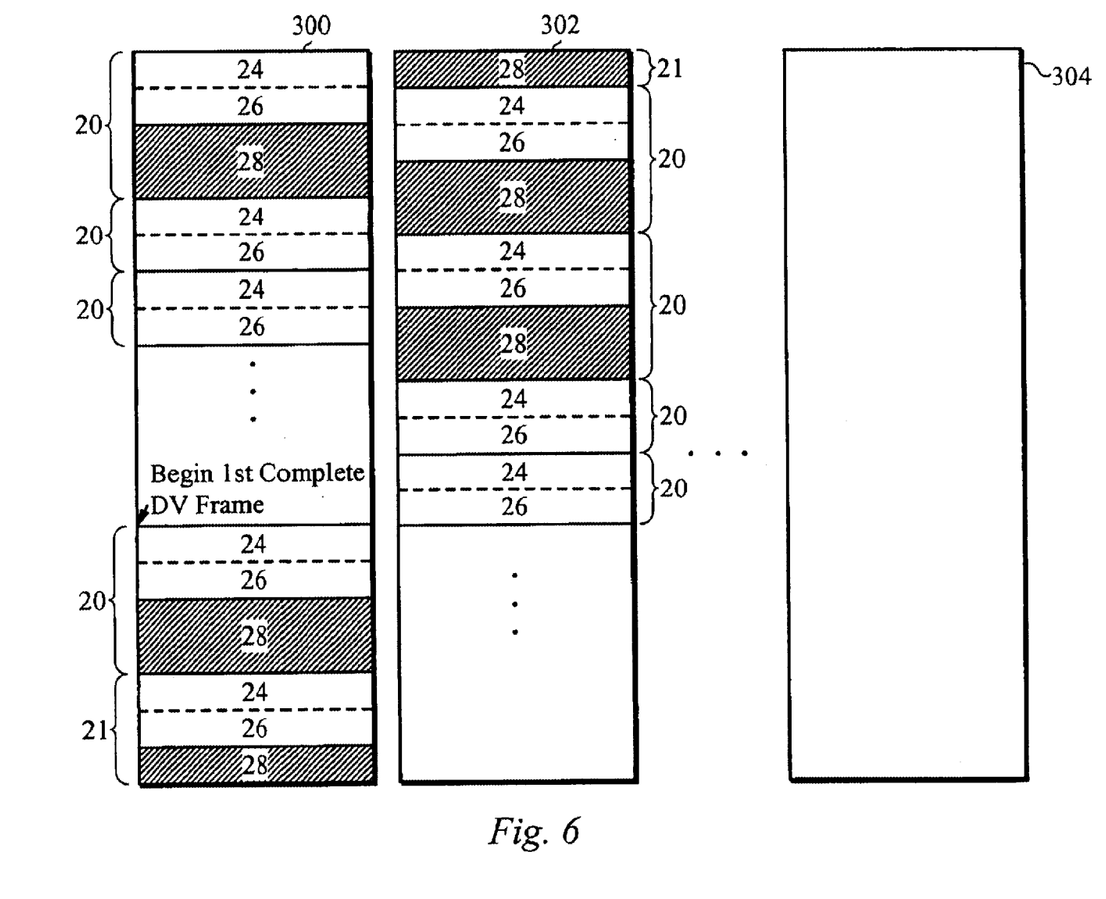
FIG. 6 is a block diagram showing a first, a second, and a kth isochronous receive buffer, which also shows an exemplary sequence of CIP packets within the first and second isochronous receive buffers.

The communication control unit 160 attaches a set of isochronous receive buffers to the bus class driver 156. FIG. 6 is a block diagram of a first, a second, and a kth isochronous receive buffer 300, 302, 304, where the first and second isochronous receive buffers 300, 302 contain an exemplary sequence of CIP packets 20. Each isochronous receive buffer 300, 302, 304 comprises a conventional buffer structure residing within the memory 130 and occupying an integral number of quadlets. In the preferred embodiment, each isochronous receive buffer 300, 302, 304 spans at least 120 kilobytes. Additionally, the isochronous receive buffers 300, 302, 304 are preferably circularly linked.

As previously indicated, successive CIP packets 20 may include both CIP header information and DV data; or CIP header information only (i.e., any given CIP packet 20 may be empty in terms of DV data content). In the description herein, reference to an "empty" CIP packet 20 is taken to mean that the CIP packet 20 includes only a first and a second CIP header quadlet 24, 26. Empty CIP packets 20 contain no DV data, and hence do not include a CIP data field 28.

A first CIP packet 20 received may not correspond to the beginning of a first DV frame 200. Hence, an initial group of CIP packets 20 within the first isochronous receive buffer 300 may comprise an incomplete DV frame 200. A subsequent CIP packet 20 within the first isochronous receive buffer 300 would then correspond to the beginning of a first complete DV frame 200. Thus, an amount of DV data sufficient to form a complete DV frame 200 may reside across multiple isochronous receive buffers 300, 302, 304. Moreover, the contents of a single CIP packet 20 may reside across two isochronous receive buffers 300, 302, 304 successively filled by the port driver 158. That is, an isochronous receive buffer 300, 302, 304 may contain a partial CIP packet 21.

Referring again to FIG. 5, the communication control module 160 additionally registers the parsing state machine 162 as a buffer-fill callback function with the operating system 140. The parsing state machine 162 is thereby automatically entered or executed once an isochronous receive buffer 300, 302 is full. After the communication control module 160 attaches the set of isochronous receive buffers 300, 302, 304 to the bus class driver 156, the bus class driver 156 passes the isochronous receive buffers 300, 302, 304 to the port driver 158.

The port driver 158 receives CIP packets 20 from the interface unit 120, and stores the CIP packets 20 in the first isochronous receive buffer 300 in the order in which they were received. Once the first isochronous receive buffer 300 is full, the port driver 158 stores any partial CIP packet contents that exceeded the boundary of the first isochronous receive buffer 300, as well as successively-received CIP packets 20, in the second isochronous receive buffer 302. The port driver 158 fills the second and subsequent isochronous receive buffers 302, 304 in a manner analogous to the filling of the first isochronous receive buffer 300.

Figure 7:
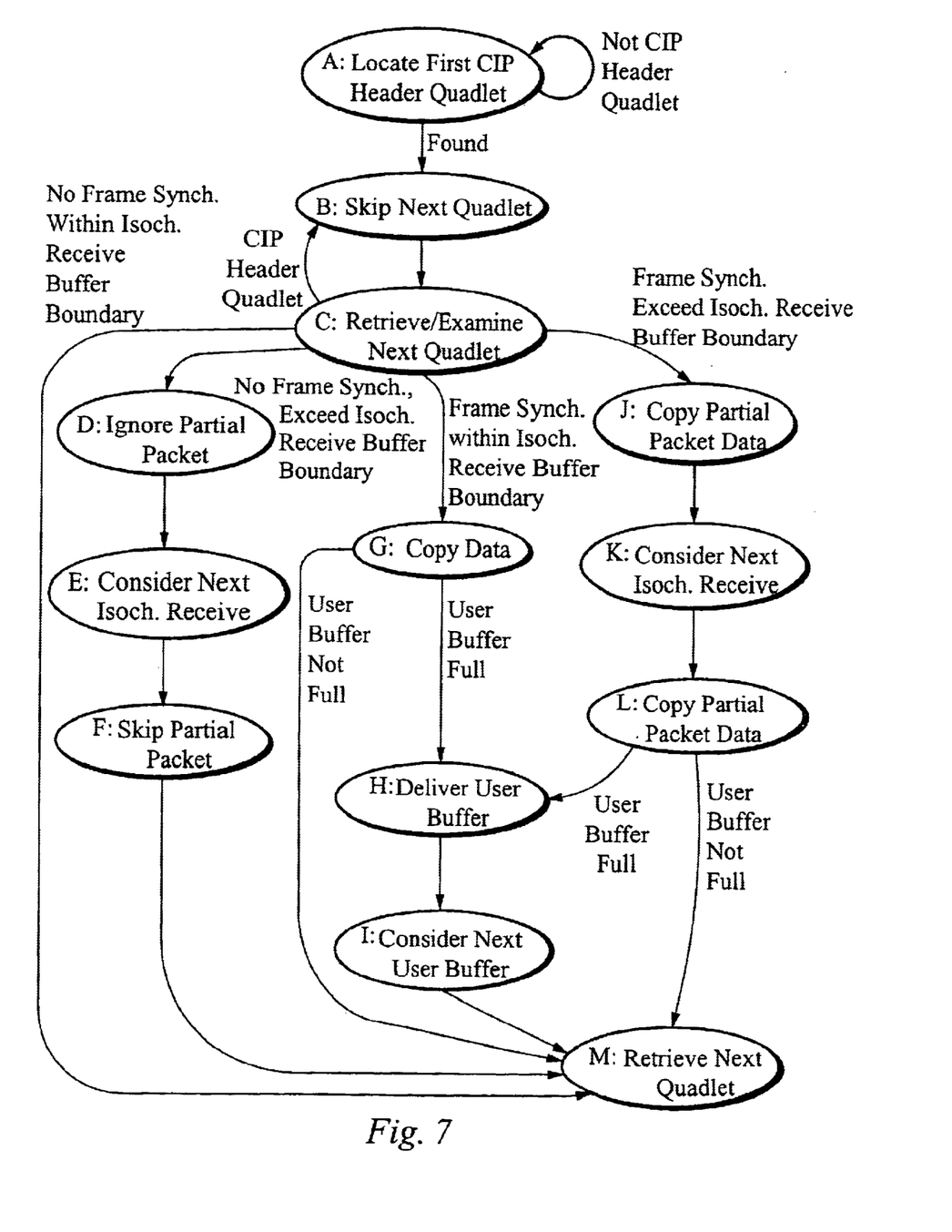
FIG. 7 is a state diagram showing a preferred sequence of states and state transition conditions for a parsing state machine of the present invention.

Once the first isochronous receive buffer 300 is full, the parsing state machine 162 is executed or entered as a callback function. FIG. 7 is a state diagram showing a preferred sequence of states A through M, inclusive, and corresponding state transition conditions for the parsing state machine 162. The parsing state machine 162 begins operation in state A by sequentially scanning or examining quadlets within the first isochronous receive buffer 300 to locate a first CIP header quadlet 24 within an initial CIP packet 20. The first CIP header quadlet 24 may be identified by comparing the contents of a quadlet under consideration with CIP header field format requirements.

Upon locating the first CIP header quadlet 24, the parsing state machine 162 transitions to state B. In state B, the parsing state machine 162 skips past the next sequential quadlet, advancing to an isochronous receive buffer location at which either 1) a CIP data field 28 would begin if the initial CIP packet 20 contains DV data; or 2) another CIP header field 2 would begin in the event that the initial CIP packet 20 is empty.

The parsing state machine 162 subsequently transitions to state C, and retrieves and examines a next sequential quadlet. If the quadlet under consideration matches the format of a first CIP header quadlet 24, then the initial CIP packet 20 was empty, in which case the parsing state machine 162 transitions back to state B. If the parsing state machine 162 encounters a quadlet that fails to match the format of a first CIP header quadlet 24, the CIP packet 20 currently under consideration includes a CIP data field 28 containing DV data.

If the presently-considered CIP packet 20 contains DV data, and a first or a new (i.e., empty) user buffer is to be filled, the parsing state machine 162 also determines whether the beginning of a DV frame 200 has been found, that is, whether the parsing operations have yet synchronized to the start of a first or subsequent DV frame 200. The parsing state machine 162 preferably makes this determination by byte-masking the contents of the block ID field 232 within the initial DIF block 230 residing in the presently-considered CIP packet's data field 28. An exemplary byte mask suitable for this purpose is 0x00FFF0E0, or 0xE0F0FF00, depending upon big-endian versus little-endian ordering considerations. While in state C, the parsing state machine 162 also determines whether the presently-considered CIP packet 20 resides entirely within the boundary of the current isochronous receive buffer 300, 302, 304. In other words, the parsing state machine 162 determines whether it is presently considering a partial CIP packet 21.

In the event that the parsing operations have not yet synchronized to the beginning of a DV frame 200, and the presently-considered CIP packet 20 resides entirely within the boundary of the current isochronous receive buffer 300, 302, 304, the parsing state machine 162 transitions to state M. In state M, the parsing state machine 162 retrieves a next sequential quadlet, and then transitions to state B to continue operations.

If the parsing operations have not yet synchronized to the beginning of a DV frame 200, and the parsing state machine 162 is currently considering a partial CIP packet 21, the parsing state machine 162 transitions to state D, in which it ignores or skips the partial CIP packet's DV data. The parsing state machine 162 then transitions to state E, and considers a next isochronous receive buffer 302, 304. Following state E, the parsing state machine 162 transitions to state F, in which it skips the partial CIP packet 21 present at the beginning of the newly-considered isochronous receive buffer 302, 304. The parsing state machine 162 then transitions to state M.

When the parsing operations have synchronized to the beginning of a DV frame 200, and the presently-considered CIP packet 20 falls entirely within the bounds of the current isochronous receive buffer 300, 302, 304, the parsing state machine 162 transitions to state G. In state G, the parsing state machine 162 copies the DV data contained in the current CIP packet's data field 28 to a user buffer. If the user buffer does not yet contain a complete DV frame, the parsing state machine 162 transitions to state M.

In the event that the user buffer becomes full following the data copy operation in state G, the parsing state machine 162 transitions to state H, and delivers the user buffer to the stream class driver 152. The parsing state machine 162 then transitions to state I to select a next available or empty user buffer for consideration, after which the parsing state machine 162 transitions to state M.

Referring again to state C, if parsing operations have synchronized to the beginning of a DV frame 200, and the presently-considered packet is a partial CIP packet 21, the parsing state machine 162 transitions to state J. In state J, the parsing state machine 162 copies the DV data from the partial CIP packet 21 into a current user buffer. The parsing state machine 162 then transitions to state K, and considers a next isochronous receive buffer 302, 304. Following state K, the parsing state machine 162 transitions to state L and copies the DV data within the partial CIP packet 21 residing at the beginning of the newly-considered isochronous receive buffer 302, 304 into the current user buffer. The parsing state machine 162 next transitions to state M.

Once a user buffer is full, it preferably contains a complete DV frame 200, in which case the parsing state machine 162 signals an event to the stream class driver 152 to initiate the return or delivery of the user buffer to the stream class driver 152. The parsing state machine 162 subsequently begins filling a new or empty user buffer with DV data in a manner described above. After receiving a full user buffer, the stream class driver 152 transfers the DV frame 200 contained therein to the multimedia API module 170, which may then perform frame-based operations such as decoding and rendering.

The present invention has been described in terms of specific embodiments incorporating details to facilitate the understanding of the principles of construction and operation of the invention. It will be apparent to those skilled in the art that modifications may be made in the embodiments chosen for illustration without departing from the spirit and scope of the invention. For example, the teachings of the present invention may be applied to situations in which CIP packets 20 selectively contain information organized in accordance with a format other than DV, such as MPEG-2 or MIDI. As another example, the destination node within the IEEE 1394-1995 network need not be a computer, but could be a device such as a digital television or set-top unit that includes a processing unit, a memory, an interface unit 120 capable of receiving an isochronous stream, and a parsing state machine analogous to that described above. As yet another example, one or more elements described herein in terms of software could be implemented partially or entirely in hardware. In light of the foregoing, reference herein to specific embodiments and details thereof is not intended to limit the scope of the claims appended hereto.

We claim:

1. A method of parsing a packet stream received from a transmission device, a subset of packets including data content, the data content generated from source data organized in accordance with a predetermined format, the method comprising:

receiving the packet stream;

storing a first and a second packet;

locating a header portion within the first packet; and determining whether a header portion within the second packet immediately follows the header portion within the first packet;

wherein the header portion within the first packet comprises a first and a second segment, and wherein locating the header portion within the first packet comprises:

retrieving binary information spanning a predetermined number of bytes from a first receive buffer; and comparing a portion of the binary information with an expected format associated with the first segment.

2. The method of claim 1, further comprising determining whether the first packet corresponds to a particular boundary within the source data.

3. the method of claim 2, wherein the boundary is the beginning of a DV frame.

4. The method of claim 1, further comprising transferring data within the first packet to a destination buffer.

5. The method of claim 4, wherein the packet stream is received isochronously.

6. The method of claim 5, wherein the packet stream is received in accordance with an IEEE 1394 standard.

7. The method of claim 1, further comprising advancing to a location in the first receive buffer past the second segment.

8. The method of claim 1, further comprising:

storing a first portion of the second packet in a first receive buffer and a second portion of the second packet in a second receive buffer.

9. The method of claim 8, further comprising:

transferring data content within the second packet from the first receive buffer to a destination buffer; and transferring data content within the second packet from the second receive buffer to the destination buffer.

10. The method of claim 8, further comprising advancing to a location in the second receive buffer that is beyond the second packet.

11. A system for parsing a stream of packets received from a transmission device, a subset of packets including data content, the system comprising:

a stream reception unit coupled to receive the stream of packets;

a processing unit coupled to the stream reception unit; and a memory coupled to the stream reception unit and comprising:

a first buffer and a second buffer;

a stream storage module, for storing a sequence of packets received from the stream reception unit in the first buffer; and a parsing module, for parsing packets stored within the first buffer, wherein the parsing module determines whether successive packets residing within the first buffer include the data content, and wherein the parsing module selectively stores the data content in the second buffer;

wherein the memory further comprises an application program interface module responsive to a signal generated by the parsing module, the signal indicating that the application program interface module may initiate operations upon the contents of the second buffer.

12. The system of claim 11, wherein the stream of packets is communicated isochronously.

13. The system of claim 11, wherein the stream reception unit comprises IEEE 1394 serial bus interface circuitry.

14. A data communication network comprising:

a network segment;

a sending node coupled to the network segment, the sending node configured for transmitting data packets upon the network, a subset of data packets including data content; and a receiving node coupled to the network segment, the receiving node configured for receiving and parsing data packets, the receiving node comprising:
   a network interface unit coupled to receive a stream of packets;
   a processing unit coupled to the network interface unit; and
   a memory coupled to the network interface unit and wherein a first buffer, a second buffer, a packet storage module, and a parsing module reside, wherein the parsing module determines whether packets that the packet storage module has stored in the first buffer include the data content, and wherein the parsing module selectively stores the data content in the second buffer and further wherein the memory further includes an application program interface module responsive to a signal generated by the parsing module, the signal indicating that the application program interface module may initiate operations upon the contents of the second buffer.

15. The data communication network of claim 14, wherein the data packets are communicated isochronously.

16. The data communication network of claim 14, wherein the network segment comprises an IEEE 1394 serial bus.

17. An IEEE 1394 serial bus network including a plurality of devices coupled together to communicate isochronous data packets, the serial bus network comprising:

an IEEE 1394 serial bus;

a transmitting device coupled to transmit a stream of packets upon the IEEE 1394 serial bus, a subset of packets including data content; and a receiving device coupled to receive the stream of packets from the IEEE 1394 serial bus, the receiving device comprising:
   a stream reception unit coupled to receive the stream of packets;
   a processing unit coupled to the stream reception unit; and
   a memory coupled to the stream reception unit and comprising:
     a first buffer and a second buffer;
     a stream storage module, for storing a sequence of packets received from the stream reception unit in the first buffer; and
     a parsing module, for examining and parsing packets stored within the first buffer, wherein the parsing module determines whether successive packets residing within the first buffer include the data content, and wherein the parsing module selectively stores the data content in the second buffer;

wherein the memory further comprises an application program interface module responsive to a signal generated by the parsing module, the signal indicating that the application program interface module may initiate operations upon the contents of the second buffer.

* * * * *